United States Patent
Dent et al.

(10) Patent No.: US 6,246,870 B1
(45) Date of Patent: Jun. 12, 2001

(54) TARIFF MANAGEMENT APPARATUS AND METHODS FOR MULTIPLE-MODE COMMUNICATIONS TERMINALS

(75) Inventors: Paul Wilkinson Dent; Elizabeth Louise Humphreys, both of Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/070,289

(22) Filed: Apr. 30, 1998

(51) Int. Cl.$^7$ ........................................ H04Q 7/20

(52) U.S. Cl. .................. 455/405; 455/412; 455/414

(58) Field of Search ........................ 455/405, 406, 455/410, 411, 414, 412, 557, 558, 550, 418

(56) References Cited

U.S. PATENT DOCUMENTS

| | | | |
|---|---|---|---|
| 4,264,956 | 4/1981 | Delaney | 364/467 |
| 4,751,728 | 6/1988 | Treat | 379/113 |
| 5,062,134 | 10/1991 | Laird | 379/131 |
| 5,107,494 * | 4/1992 | Johnson et al. | 370/95 |
| 5,109,401 | 4/1992 | Hattori et al. | 379/58 |
| 5,317,545 | 5/1994 | Gray et al. | 368/4 |
| 5,497,411 | 3/1996 | Pellerin | 379/59 |
| 5,524,145 | 6/1996 | Parker | 379/197 |
| 5,577,100 | 11/1996 | McGregor et al. | 379/58 |
| 5,615,260 | 3/1997 | Kurgan | 379/433 |
| 5,631,947 | 5/1997 | Wittstein et al. | 379/59 |
| 5,659,601 | 8/1997 | Cheslog | 455/406 |
| 5,761,624 | 6/1998 | Mooney et al. | 455/558 |
| 5,831,256 | 11/1998 | De Larminat et al. | 235/486 |
| 5,862,471 | 1/1999 | Tiedemann, Jr. et al. | 455/406 |
| 5,867,795 | 2/1999 | Novis et al. | 455/566 |
| 5,870,671 * | 2/1999 | Martinez | 455/409 |
| 5,898,915 | 4/1999 | Reininghaus et al. | 455/406 |
| 5,915,214 | 6/1999 | Reece et al. | 455/406 |
| 5,915,226 | 6/1999 | Martineau | 455/558 |
| 5,933,785 * | 9/1999 | Tayloe | 455/558 |
| 5,987,325 * | 11/1999 | Tayloe | 455/435 |
| 6,098,878 * | 8/2000 | Dent et al. | 235/380 |

FOREIGN PATENT DOCUMENTS

| | | |
|---|---|---|
| 0 647 055 A1 | 4/1995 | (EP) . |
| 0 724 371 A1 | 7/1996 | (EP) . |
| 0 808 073 A2 | 11/1997 | (EP) . |
| WO 94/28670 * | 5/1994 | (WO) . |
| WO 94/28670 | 12/1994 | (WO) . |
| WO 94/28683 | 12/1994 | (WO) . |

(List continued on next page.)

*Primary Examiner*—William Trost
*Assistant Examiner*—Congvan Tran
(74) *Attorney, Agent, or Firm*—Myers Bigel Sibley & Sajovec (57) ABSTRACT

In a multiple-mode communications terminal, such as a dual-mode analog/digital cellular radiotelephone, cumulative usage of communications units in multiple modes is measured for comparison to stored critical values of tariffs for each of the modes, and measures to control usage are initiated based on an economic efficiency of the multiple modes. More specifically, expenses incurred by a communications terminal that communicates with a first mobile radiotelephone system and a second mobile radiotelephone system are controlled by storing first and second critical values which characterize a tariff structure of the respective first and second mobile radiotelephone communication systems. Communications units used by the communications terminal are measured. An economic efficiency associated with use of the terminal to communicate with the first and second mobile radiotelephone communications systems is determined from the measured communications units and the first and second stored critical values. Measures are initiated to control communications usage with the first and second radiotelephone communications systems by the terminal based on the determined economic efficiency.

54 Claims, 9 Drawing Sheets

FOREIGN PATENT DOCUMENTS

| | | |
|---|---|---|
| WO 95/28062 | 10/1995 | (WO) . |
| WO 96/24226 | 8/1996 | (WO) . |
| WO 96/28947 | 9/1996 | (WO) . |
| WO 98/58512 | 12/1998 | (WO) . |

* cited by examiner

TARIFF MANAGEMENT APPARATUS AND METHODS FOR MULTIPLE-MODE COMMUNICATIONS TERMINALS

CROSS-REFERENCE TO RELATED APPLICATIONS

This application is related to application Ser. No. 08/888,229, filed Jul. 3, 1997, entitled "Tariff Management Apparatus and Methods for Communications Terminals", to Irvin, assigned to the assignee of the present application, and to application Ser. No. 09/070,305 filed concurrently, entitled "Tariff Management Apparatus And Methods For Communications Terminals Using Smart Cards" to the present inventors and assigned to the assignee of the present invention. The disclosures of both these applications are hereby incorporated herein by reference.

FIELD OF THE INVENTION

The present invention relates to communications systems and methods, in particular, to systems and methods for controlling costs associated with use of communications services.

BACKGROUND OF THE INVENTION

The cost of premium communication services such as cellular telephone or packet data services tends to be a significant impediment to universal use of these services. As a result, service providers regularly introduce new price schedules, often referred to as tariff options or outlay schedules to make these services more attractive to a wider group of consumers. Typically, these series of price schedules represent a series of so-called "Pareto" improvements, a new tariff option being a Pareto improvement over an established set of tariff options if at least one person is better-off economically and no one is worse off as result.

An ideal tariff structure generally would compute service charges ex post, i.e., the most economic tariff option would be used based on the customer's actual use during a particular billing cycle so that the customer would be charged the lowest amount supported by any one of the possible tariff options. In practice, however, complex tariffs are normally used to compute service charges ex ante, i.e., the customer pre-selects a tariff option based on expected traffic pattern and lives with the result, even though other options were available that would have resulted in lower service charges had they been selected ex post. Once a particular tariff option is chosen ex ante, the customer has little insight into the charges accruing, and is therefore exposed to the risk of incurring excessive charges. In addition, an unauthorized user, e.g., an overly talkative child or a thief who steals a cellular telephone to make unauthorized calls, may incur excessive charges under a tariff option selected by the primary user in expectation of low usage.

Unfortunately, cellular subscribers typically are limited in their ability to determine their status with respect to the tariff structure of the systems to which they subscribe. Conventional cellular radiotelephones provide mechanisms for measuring duration of a present call, for measuring and storing duration of a last call, for measuring and storing cumulative call duration, and for measuring and storing cumulative on-time. However, these parameters typically are not readily usable by the operator of the phone for determining usage with an eye to minimizing usage charges.

Many radiotelephone terminals may operate in multiple modes to communicate with multiple radiotelephone systems. For example, a dual-mode analog (AMPS) and digital radiotelephone may be employed in those areas that include both analog and digital cellular communication systems. As another example, combined cellular and satellite radiotelephones may also be used in those areas where analog and/or digital cellular systems and a satellite system overlap. As yet another example, a conventional analog or digital cellular system may be usable in a local region and in a roaming region, where different tariff structures may apply.

Multi-mode use of a communications terminal may exacerbate the problems noted above because multiple tariff structures may be involved. These multiple tariff structures may make it even more difficult for a user to determine usage with an eye to minimizing usage charges.

SUMMARY OF THE INVENTION

In light of the foregoing, it is an object of the present invention to provide improved systems and methods for controlling expenses incurred by a multiple mode communications terminal.

It is another object of the present invention to provide systems and methods for controlling a multiple-mode communications terminal which prevent incurring of excess charges by an unauthorized user.

These and other objects, features and advantages are provided according to the present invention, by multiple-mode communications terminals and methods of operation therefor in which cumulative usage of communications units in multiple modes is measured for comparison to stored critical values of tariffs for each of the modes, and in which measures to control usage are initiated based on an economic efficiency of the multiple modes. More specifically, expenses incurred by a communications terminal that communicates with a first mobile radiotelephone system and a second mobile radiotelephone system are controlled by storing first and second critical values which characterize a tariff structure of the respective first and second mobile radiotelephone communication systems. Communications units used by the communications terminal are measured. An economic efficiency associated with use of the terminal to communicate with the first and second mobile radiotelephone communications systems is determined from the measured communications units and the first and second stored critical values. Measures are initiated to control communications usage with the first and second radiotelephone communications systems by the terminal based on the determined economic efficiency.

The measures to control communications usage may initiate a communications session with one of the first and second mobile radiotelephone communications systems based on the determined economic efficiency. A communications session with one of the first and second mobile radiotelephone communications systems may be automatically initiated in response to user initiation of a radiotelephone communications session. Alternatively, a user may be directed to initiate a communications session with one of the first and second mobile radiotelephone communication systems based on the determined economic efficiency in response to user initiation of a radiotelephone communication. In this regard, the user may be directed to initiate a communications session by providing at least one of a visible indication and an audible indication to the user. Accordingly, the radiotelephone may automatically or manually initiate a communications session with a first or a second mobile radiotelephone communications system based on a determined economic efficiency. Thus, for example, if all of the free monthly usage for an analog cellular system has already been used, new outgoing calls may be automatically or manually directed to a satellite system where the minimum monthly free charges have not been used.

Similar operations may take place during a communications session between the communications terminal and one of the first and second mobile radiotelephone communications systems. During the communications session, the communication units are measured. Then, during the communications session, measures are initiated to control communications usage based on the determined economic efficiency during the communications session. For example, handover of the communications session from one of the first and second mobile radiotelephone communications systems to the other of the first and second mobile radiotelephone communications systems may be performed based on the determined economic efficiency during the communications session. Alternatively, a user may be directed to initiate a new communications session with the other of the first and second mobile radiotelephone communications systems based on the determined economic efficiency. In this regard, a visible indication and/or an audible indication may be used to indicate to a user to initiate a new communications session. In another alternative, a communications session with the one of the first and second mobile radiotelephone communications systems may be terminated based on the determined economic efficiency. Alternatively, the user may be directed to terminate the communications session, by an audible indication and/or a visible indication.

The first and second critical values may be stored in a smart card that is coupled to the communications terminal. Corresponding first and second billing cycle dates may also be stored in the smart card. In addition, user identification information that secures this information may also be stored in the smart card. The first and second critical values may comprise the values of monthly communications units that are allowed for a fixed fee, including no fee, by the respective first and second mobile radiotelephone communications systems. In addition, respective incremental fees for monthly communications units that exceed the respective first and second amounts may also be stored. Separate critical values may be stored for incoming and outgoing monthly communications units with separate tariff structures.

It will be understood that the present invention may be provided as systems, methods and mobile radiotelephones. Enhanced capabilities for controlling communications expenses may thereby be provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Although the description of the preferred embodiments herein refers to cellular telephony, the present invention is also applicable to communications systems other than cellular communications systems. For example, the present invention may be used with data communication services such as packet data or frame relay systems, wherein communications units are packet counts or frame counts rather than minutes-of-use. An embodiment of the present invention could therefore be usefully employed in, for example, a wireless telephone, a network-management application running on a data communication terminal such as a personal computer, laptop computer or personal digital assistant, and the like.

Figure 1:
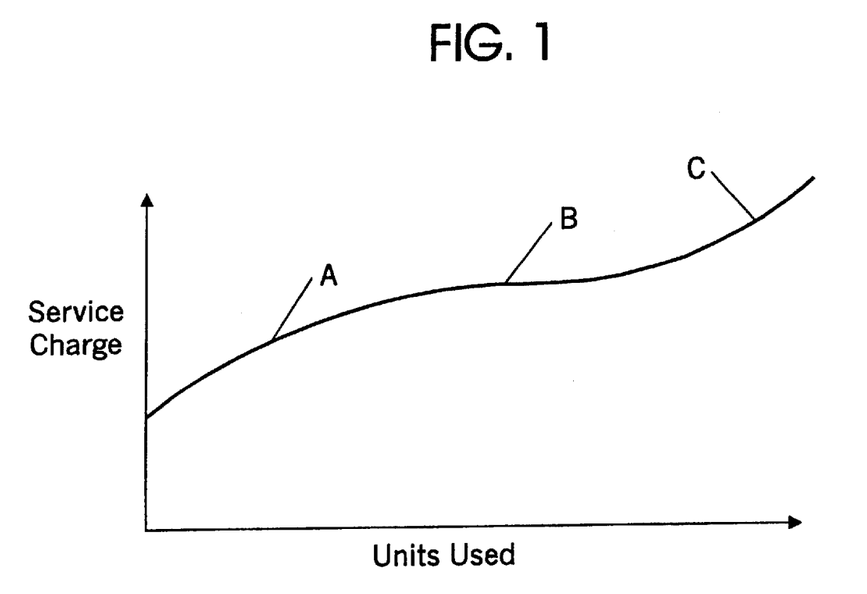
FIG. 1 is a graph illustrating a typical nonlinear communications tariff.

FIG. 1 illustrates a typical tariff structure or outlay function, in particular, a typical non-linear tariff. Message units, e.g., monthly cumulative minutes of cellular telephone use, are displayed along the horizontal axis; monthly service charge is displayed along the vertical axis. The tariff may be roughly divided into three regions: a convex region A, a concave region C, and a flat region B located between the curved regions A and C. According to economic theory, the curve shown in FIG. 1 represents a mathematical relationship known as the inverse elasticity rule for non-uniform pricing; at each point on the outlay schedule, the percentage markup between marginal cost and marginal price is inversely proportional to elasticity of demand with respect to marginal price. The y-intercept or offset shown in FIG. 1 may help to recover the fixed costs of providing service, and, if elevated above that recovery level, to recapture a portion of consumer surplus.

Viewed another way, the convex region A of FIG. 1 offers an operating range attractive to casual users and flat region B offers an operating range attractive to high-volume users, while concave region C discourages system overload and arbitrage. The kind of tariff structure illustrated in FIG. 1 appears to be well-grounded in economic theory and supported by empirical data, and therefore may continue to be used as communications services continue to evolve.

Figure 2:
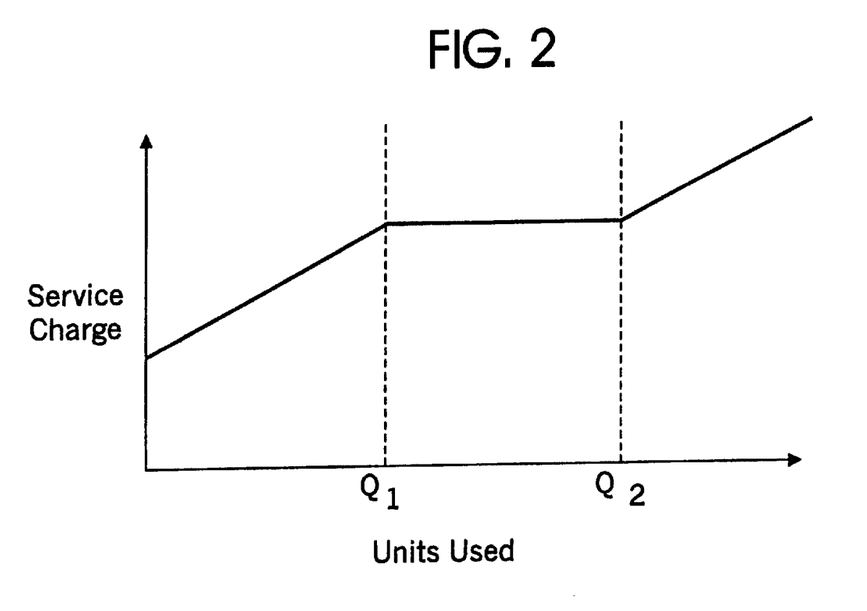
FIG. 2 is a graph illustrating a typical multi-part communications tariff.

However, because the general population is typically unable to intuitively grasp a nonlinear tariff having a continuous first derivative, service providers typically employ a piecewise linear approximation to a nonlinear tariff, as illustrated in FIG. 2. This kind of segmented tariff structure is commonly called a multi-part tariff; for example, the tariff structure of FIG. 2 represents a four-part tariff.

Figure 3:
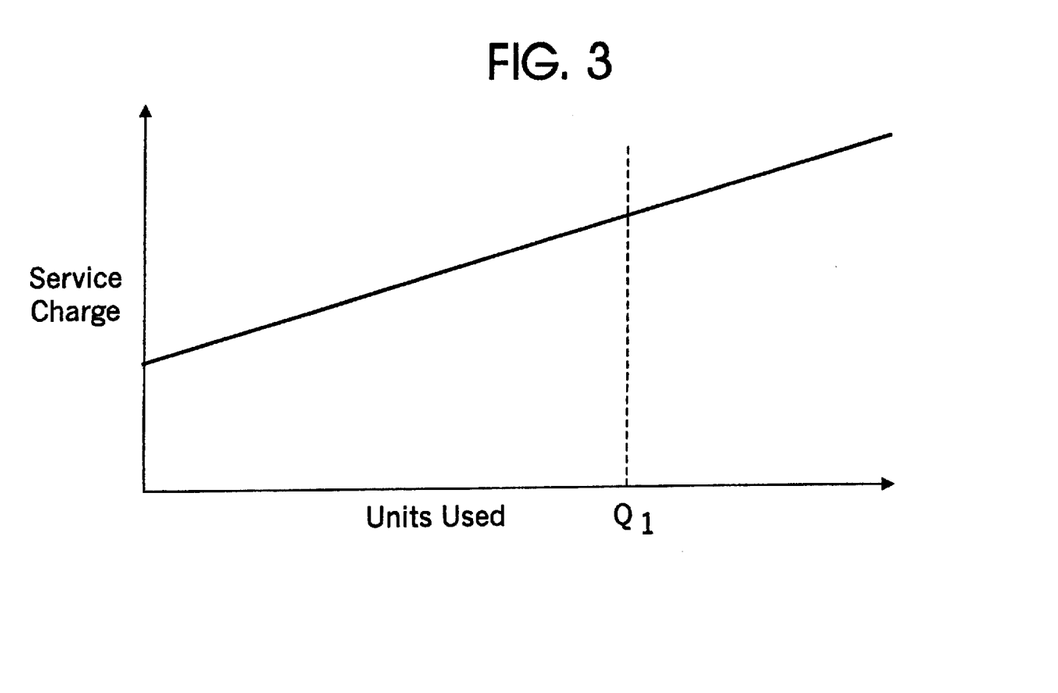
FIGS. 3 and 4 are graphs illustrating other types of multi-part communications tariffs.
Figure 4:
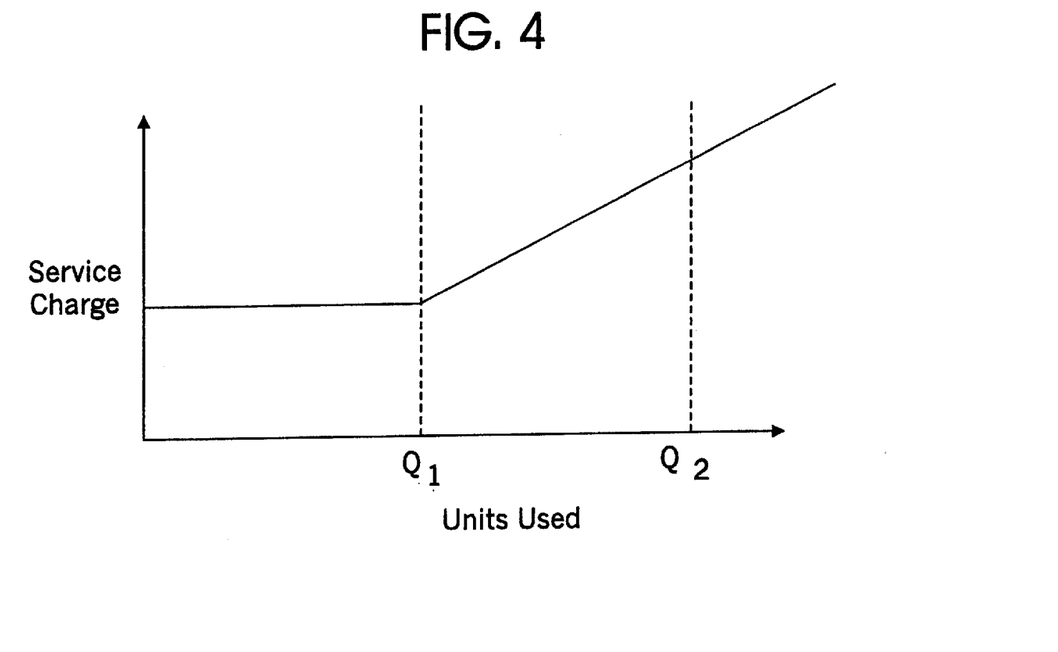

Within a multi-part tariff, there are certain critical values at which the pricing schedule changes its nature. These values are represented by the points $Q_1$ and $Q_2$. Because of the linear nature of a multi-part tariff, a knowledge of these values can fully characterize the outlay schedule. As other examples, FIGS. 3 and 4 show a two-part tariff and a three-part tariff, respectively, along with appropriate critical points. In these figures, the critical values $Q_1$ and $Q_2$ may represent pre-determined budget constraints unrelated to the tariff per se.

Figure 5:
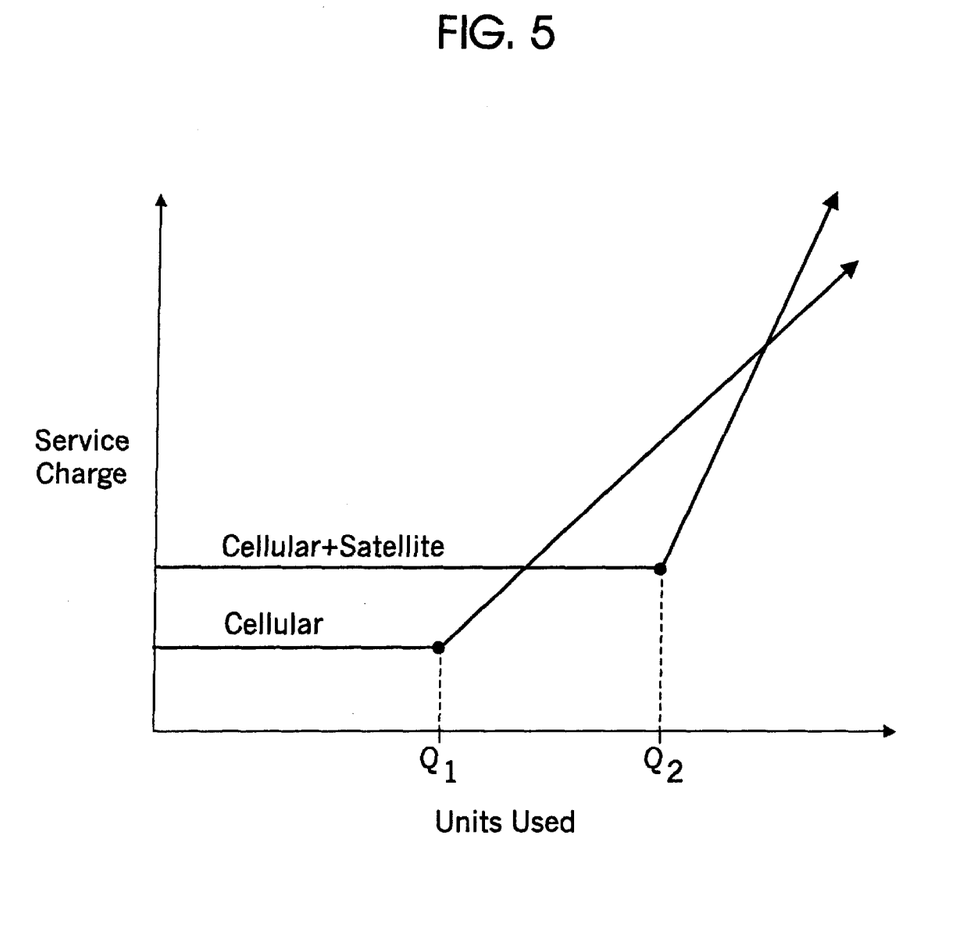
FIG. 5 is a graph illustrating typical multi-part communications tariffs for multiple-mode radiotelephones.

FIG. 5 illustrates a conventional tariff structure or outlay function for a dual-mode communications terminal. In particular, in FIG. 5, a dual-mode satellite and cellular radiotelephone is usable both with a satellite radiotelephone communications system and a cellular radiotelephone communications systems. FIG. 5 shows the cumulative monthly charge as a function of minutes of use for a conventional cellular-only system, and a dual-mode satellite-cellular system with calls placed over the satellite alone. When during the same month some calls are placed via the satellite system and some via the cellular system, the curve would be combination of these two curves.

The initial flat portion of the cellular curve in FIG. 5 represents the constant monthly subscription, in which a number of "free" minutes are included. The flat portion on the cellular-satellite curve of FIG. 5 represents the cost of subscribing to both the satellite and cellular services, with a number of free minutes on the satellite included. After the respective numbers of free minutes have been used, a per-minute tariff is used, and greater slope for satellite usage compared to satellite usage beyond the flat portion represents a greater per minute cost for satellite air time compared to cellular air time. FIG. 5 is illustrative only, and the number of free minutes included in the cellular subscription is not necessarily less than the number of free minutes included in the satellite subscription, but could be greater. Likewise, the cost of air time may not be greater in the satellite case due to its use of more spectrally efficient voice coding. Nevertheless, the shape of the respective cumulative charge curves is characterized by the respective breakpoints $Q_1$ and $Q_2$ together with the subscription fees and air time charges.

According to the invention, the dual-mode, satellite-cellular phone manages economic efficiency for the user. The efficiency management may be enabled by the user or overridden. If enabled, the efficiency management seeks to place each new call via the system, satellite or cellular, which will result in lowest cumulative monthly charge. For example, one strategy would be to place calls preferentially via the cellular system until the number of free minutes included in the cellular part of the subscription is exhausted. Then, calls would be placed via the satellite system until the number of free minutes included in the satellite service subscription is exhausted. Thereafter, calls would be placed via the system offering the lowest per-minute charge.

Implementing the above strategy may be complicated by the following factors. First, the preferred system may not always be available, forcing temporary use of the less-preferred system. Cumulative call timers can keep track of the number of minutes used in each system. The cumulative call timers are reset at the end of a billing period. Their values may be saved in archive memory before resetting. Moreover, the billing period for the two systems may not be synchronous. For example, a billing period for cellular may end on the last day of every month while a billing period for satellite ends on the fifteenth of every month. Therefore, knowledge may need to be stored regarding not only the tariffs and breakpoints, but also the date (and possibly time) at which a billing cycle ends or begins. To utilize the latter, a real-time clock-calendar may also be provided.

Some radiotelephone systems broadcast real-time clock-calendar information to which radiotelephones can synchronize their internal clocks, should they become wrong due to power interruptions. To facilitate the invention, the respective systems with which the subscriber has a subscription may broadcast an indication indicating the transition to a new billing period.

According to the invention, first and second critical values which characterize a tariff structure of respective first and second mobile radiotelephone communications systems are stored, preferably in a smart card that is coupled to the communications terminal. Communications units used by the communications terminal are measured. An economic efficiency associated with use of the terminal to communicate with the first and second mobile radiotelephone communications systems is determined from the measured communications units and from the first and second stored critical values. Measures are initiated to control communications usage with the first and second radiotelephone communications systems by the terminal based on the determined economic efficiency. For example, the number of monthly free minutes of air time may be different for each service and may even be zero. Moreover, the tariffs for one service may be higher than for another, and their billing cycles may be different.

According to the invention, the communications terminal can automatically initiate a radiotelephone communication via the system offering the lowest tariff, if that system is available. Alternatively, the user may be directed to initiate a radiotelephone communication with the system offering the lowest tariff. Moreover, during a radiotelephone communication, if the terminal detects that the tariff for the system currently in use is likely to change, such as by having exhausted the number of free monthly minutes in that billing cycle, the most economic service may be automatically recomputed and communications may be automatically handed off to the lower tariff system. If automatic handoff between different systems during a call is not technologically implemented, an indication may be provided to the user of the imminent tariff change, allowing the user to choose to complete radiotelephone communication, terminate the radiotelephone communication, or redial the radiotelephone communication via the lower tariff system. Alternatively, the radiotelephone communication may be automatically terminated.

Figure 6:
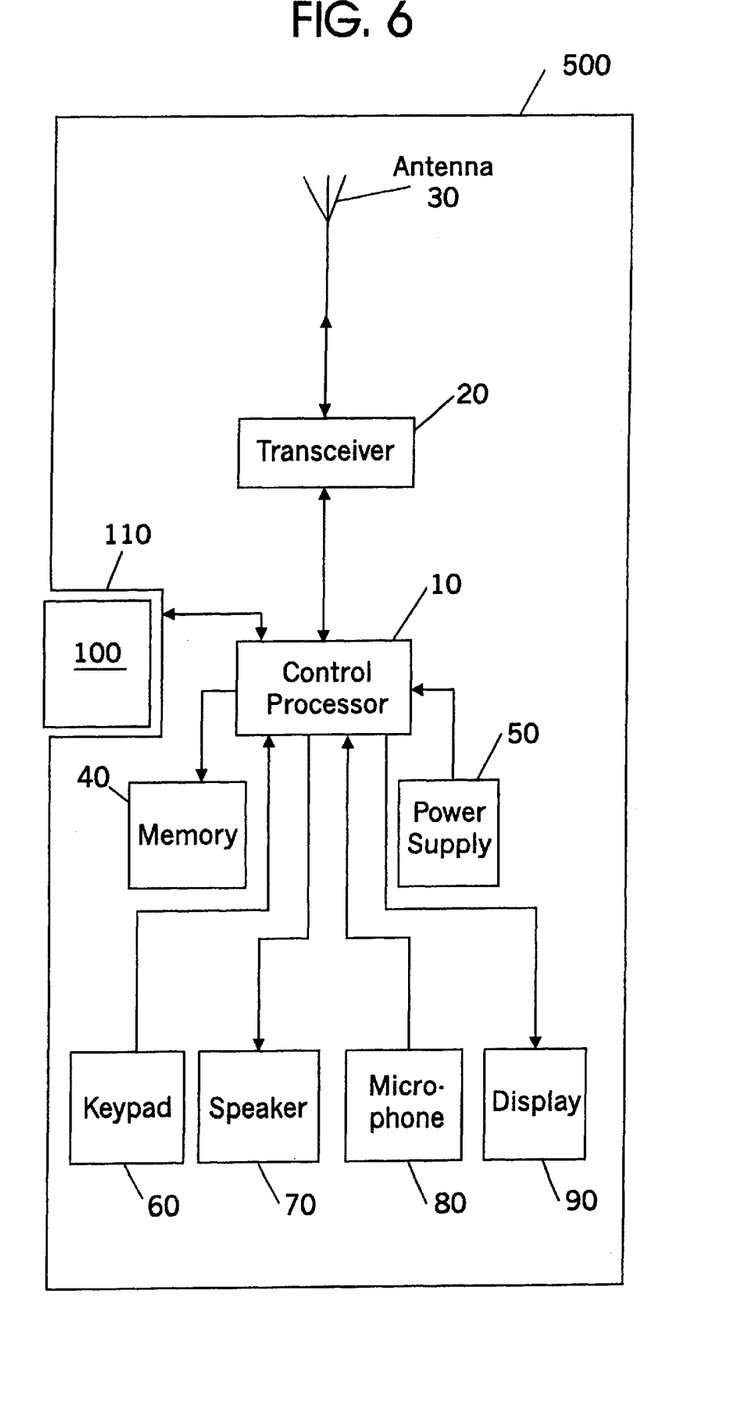
FIGS. 6 and 7 are schematic illustrations of a radiotelephone apparatus in which the present invention may be practiced.
Figure 7:
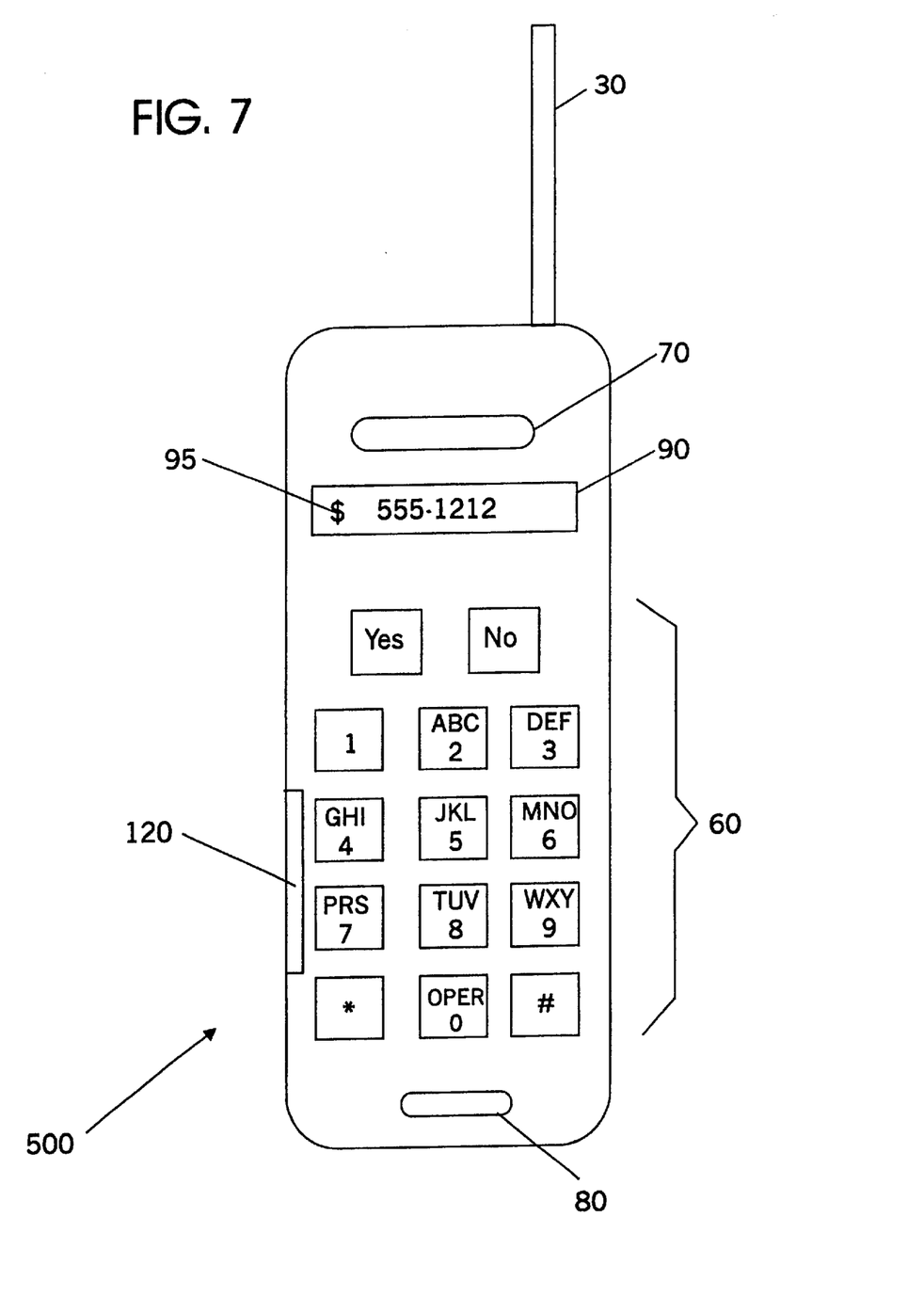

Those skilled in the art will appreciate that apparatus and operations of the present invention may be implemented using a communications terminal such as the cellular radiotelephone 500 illustrated in FIGS. 6 and 7. The radiotelephone 500 includes a control processor, e.g., a microprocessor, which controls operations of a transceiver 20 which is operative to send and receive communications signals via an antenna 30. The control processor 10 is operatively associated with memory 40, e.g., random access memory (RAM), programmable read only memory (PROM) and the like, for storage of operating programs and data. Power supply 50 supplies power to the control processor 10 and other elements of the radiotelephone 500. The control processor 10 also is operatively associated with a keypad 60, a speaker 70, a microphone 80 and a display 90. As illustrated in FIG. 7, the display 90 may include one or more graphical fields 95.

As also shown in FIGS. 6 and 7, the smart card 100 is coupled to control processor 10 via smart card interface 110. The design of smart card 100 and smart card interface 110 are well known to those having skill in the art, and need not be described further herein. Smart card 100 may be inserted in radiotelephone 500 via slot 120 or other conventional means.

Figure 8:
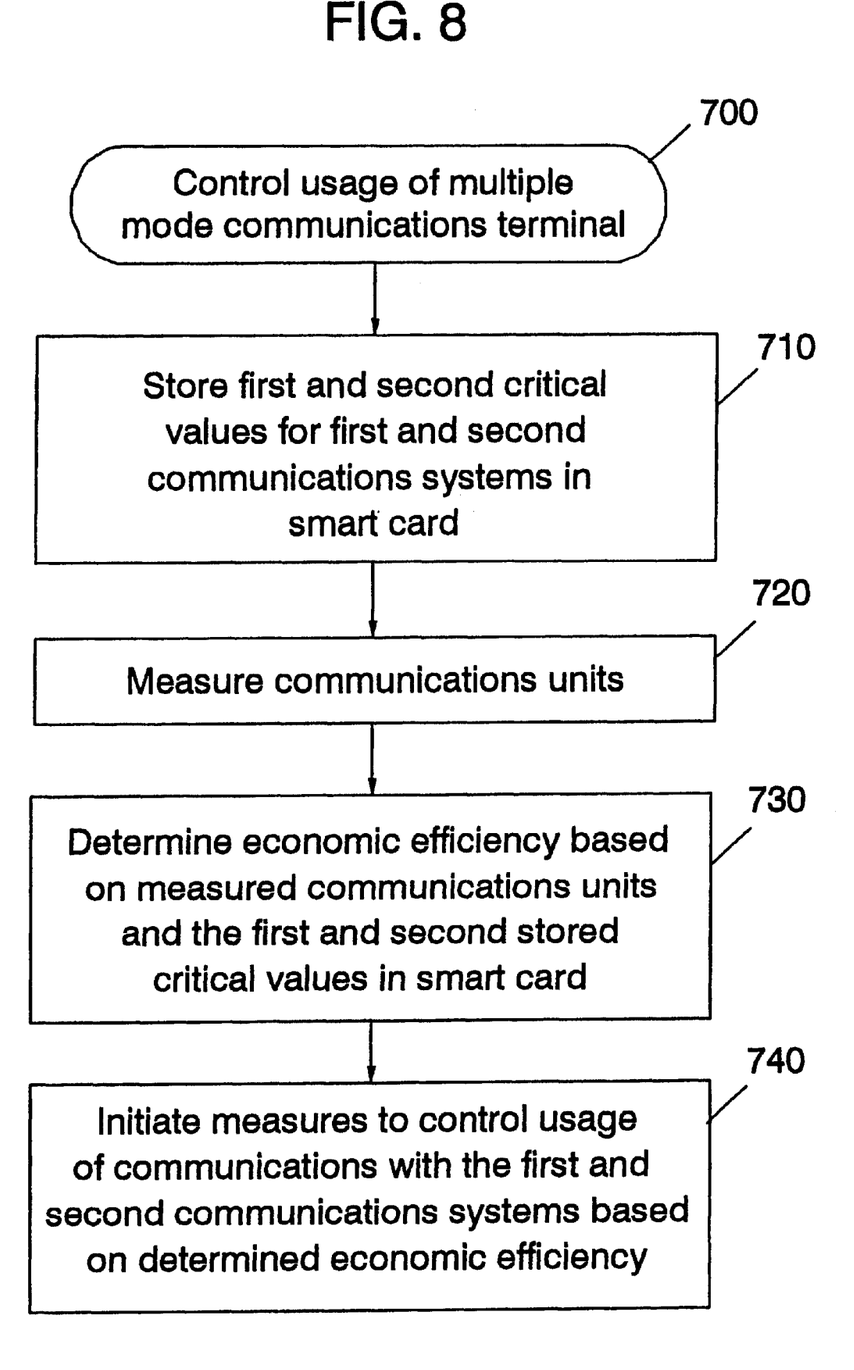
FIGS. 8–10 are flowchart illustrations of operations for controlling a communications terminal according to the present invention.
Figures 9, 9B:
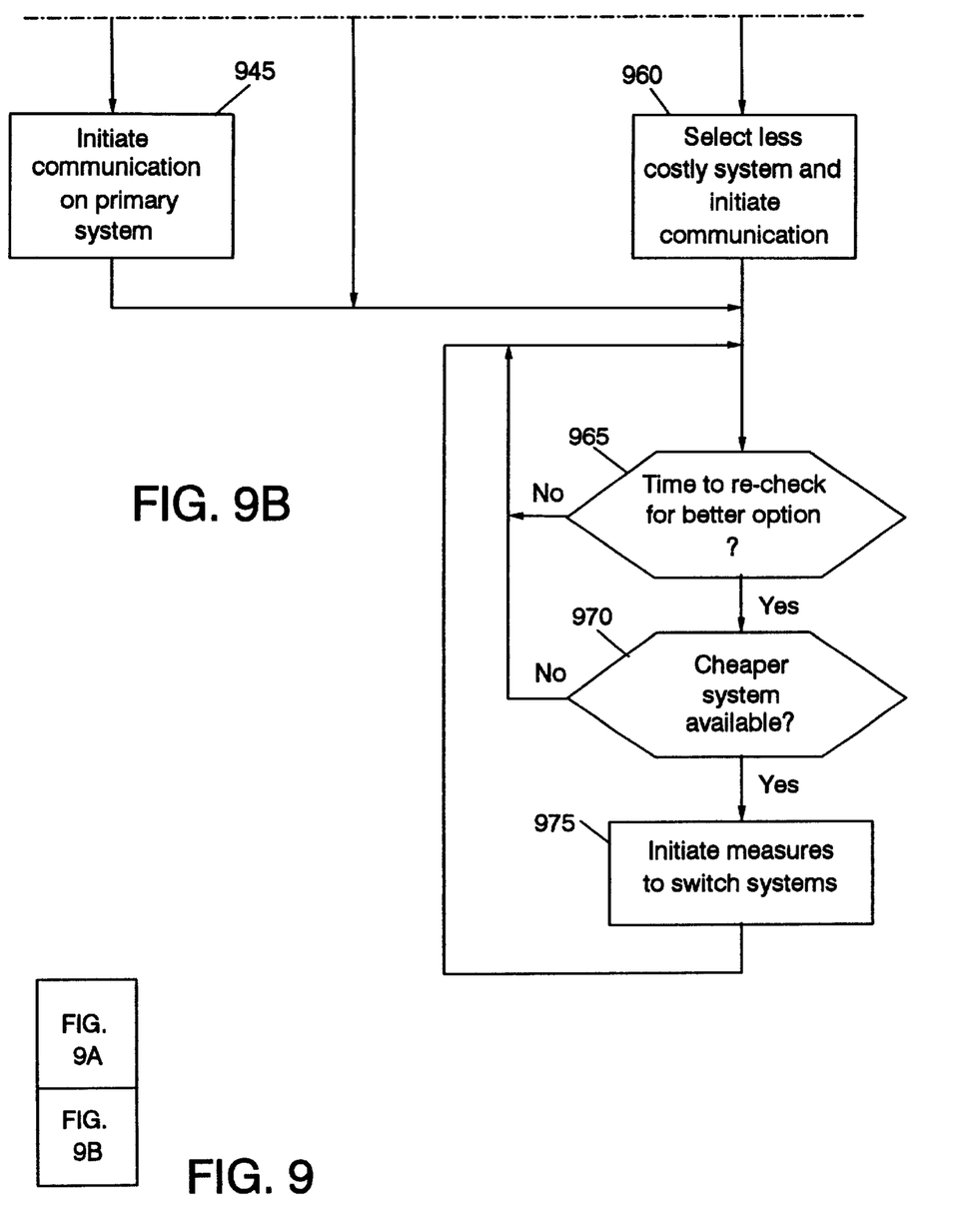
Figure 9A:
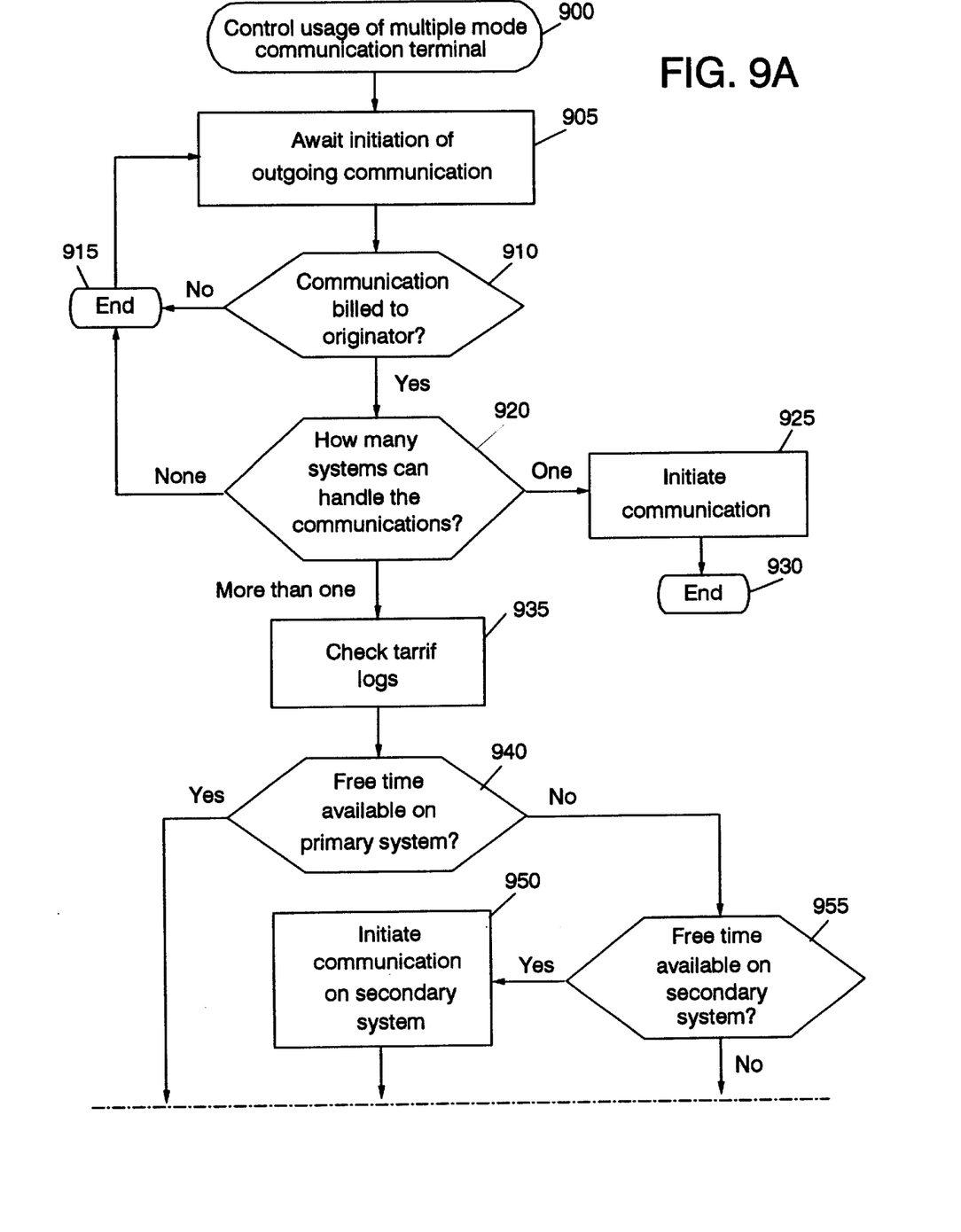
Figure 10:
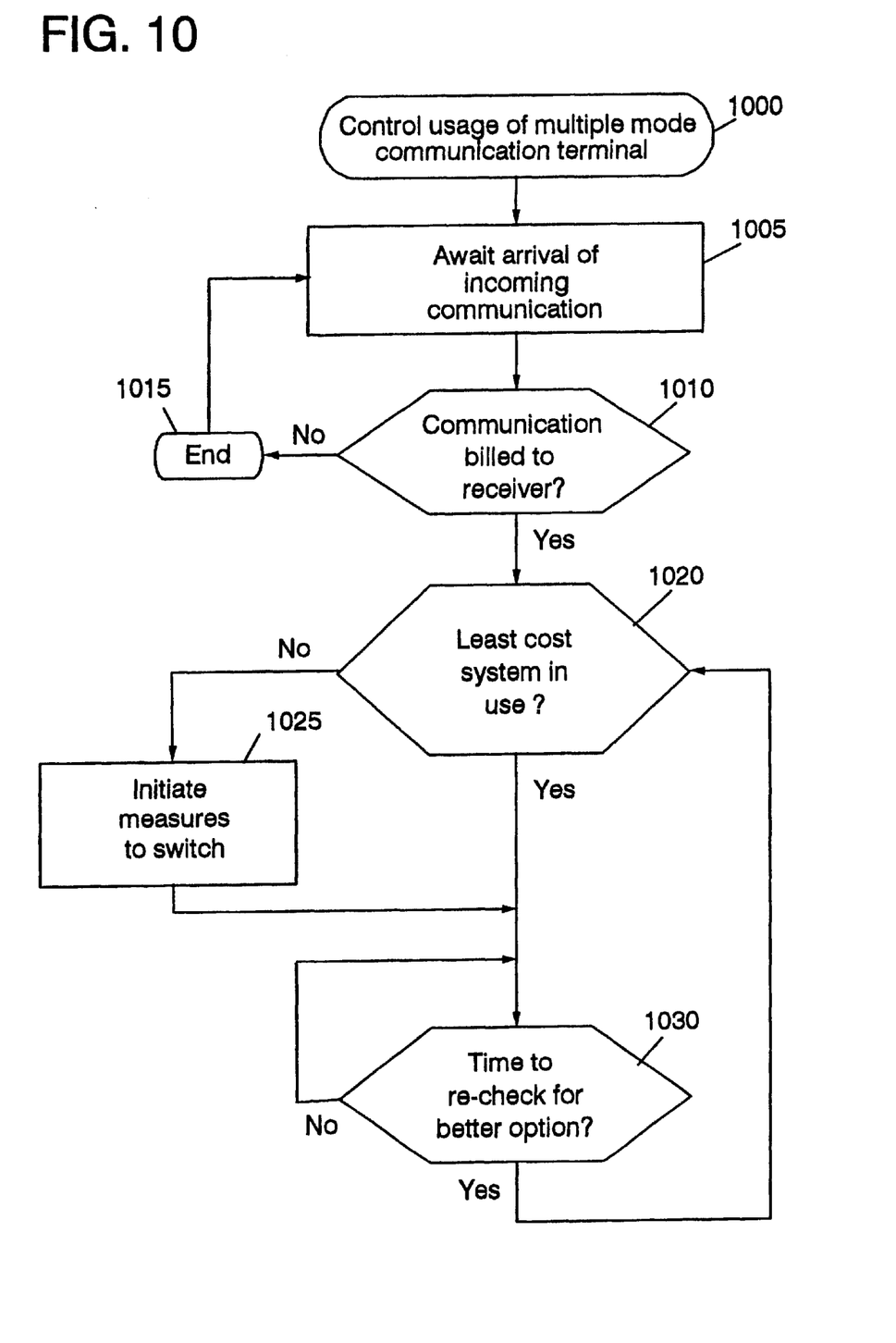

FIGS. 8–10 are flowchart illustrations of methods and apparatus which may be implemented on a communications terminal such as the radiotelephone 500 illustrated in FIG. 6. It will be understood that each block of the flowchart illustrations, and combinations of blocks in the flowchart illustrations, can be implemented by computer program instructions. These computer program instructions may be loaded onto a computer or other programmable data processing apparatus, e.g., the control processor 10 of the radiotelephone 500, to produce a machine such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

FIG. 8 illustrates operations for controlling usage of a multiple-mode communications terminal according to the present invention (Block 700). One or more critical values for communications tariffs for first and second communications systems are stored, preferably in a smart card 100 (Block 710). The terminal communicates with one of the communications systems, e.g., sends or receives voice information or data packets, with the communications units used during communications being measured (Block 720). An economic efficiency is determined based on the stored critical values and the measured communications units (Block 730). Measures are initiated to control communications by the terminal with the first and second communications systems based on the determined economic efficiency (Block 740).

It will be understood that smart card 100 may store other information that is used by radiotelephone 500, including but not limited to encryption keys, user identification and stored values indicating the value of communications services that were purchased. Moreover, the smart card preferably stores a monthly billing cycle start-up date, so that cumulative usage values may be reset at the start of a billing cycle.

It will be understood that by initiating measures for controlling communications unit usage, the description herein refers to a variety of actions which may cause usage of the terminal to be terminated or curtailed, either by the user or automatically. For example, a communications session may be initiated with one of the first and second mobile radiotelephone communications systems based on the determined economic efficiency. The communications session may be automatically initiated in response to user initiation of a radiotelephone communication. Alternatively, the user may be directed to initiate a communications session with one of the first and second mobile radiotelephone communications systems based on the determined economic efficiency. A visible and/or audible indication may be provided to the user to initiate a communication session with one of the first and second mobile radiotelephone communications systems based on the determined economic efficiency.

In another alternative, during a communications session, communication units that are used are measured. Measures are initiated to control communications usage by the communications terminal with one of the first and second mobile radiotelephone communications systems, based on the determined economic efficiency during the communications session. For example, a handover may be automatically performed from one of the first and second mobile radiotelephone communications systems to the other of the first and second mobile radiotelephone communications systems based on the determined economic efficiency. Alternatively, the user may be directed to initiate a new communications system with the other of the first and second mobile radiotelephone communications systems based on the determined economic efficiency. The user may be directed by providing a visible and/or audible indication. Alternatively, the communications session may be automatically terminated based on the determined economic efficiency, or the user may be directed to terminate the communications system by a visible indication and/or an audible indication.

A display may be provided to a user of the terminal which indicates the determined economic efficiency associated with operation of the terminal. The user may respond to this indication in various ways, such as by terminating a call or communications session, or by disregarding the message and continuing to use the terminal. Automatic measures may also be included which are not subject to user control, such as disabling of dialing or other features of the terminal.

FIG. 9 illustrates operations for controlling a multiple-mode communications terminal for outgoing communications according to the present invention (Block 900). Initiation of an outgoing radiotelephone communication is awaited at Block 905. Upon initiation of an outgoing radiotelephone communication, a determination is made at Block 910 as to whether the communication is billed to the originator. If not, then operations end at Block 915. If the outgoing communications are billed to the originator, then at Block 920 a determination is made as to how many systems can handle the outgoing communication. If no systems can handle the communications, operations end at Block 915, and if only one system can handle the communication, the radiotelephone communication is initiated at Block 925 and the operations end.

Continuing with the description of FIG. 9, if more than one communications system can handle the communication, then tariff logs are checked at Block 935 to determine the cumulative units uses for each of these systems. At Block 940, a determination is made as to whether free time is still available on the primary system for the radiotelephone. If YES, then at Block 945, the call is placed on the primary service. If NO, then a determination is made at Block 955 as to whether free time is available on the secondary system. If YES, then at Block 950, the communication is initiated on the secondary system.

At Block 960, if free time is not available on the primary system or the secondary system, then a determination is made as to which system is less costly, and the communication is initiated at the less costly system at Block 960. During the radiotelephone communication, a check is repeatedly made at Block 965 as to whether it is time to recheck for a better option. If YES, at Block 970 a test is made as to whether an unused system would be cheaper. If YES, then measures are initiated to change. As already described, handover may be automatically performed or the user may be alerted to switch systems.

FIG. 10 illustrates operations for controlling usage of a multiple-mode communications terminal during incoming communications (Block 1000). Operations begin at Block 1005 by awaiting arrival of an incoming communication. When an incoming communication arrives, a test is made at Block 1010 as to whether the communication is billed to the receiver. If not, operations end at Block 1015. If YES, a determination is made at Block 1020 as to whether the least cost system is in use. If NO, then measures to switch systems are initiated at Block 1025. The system may be switched automatically, or user indications may be provided as was already described. At Block 1030, during the communications, a check is also made as to whether a better option may be obtained. If so, measures may be initiated to switch at Block 1025. It is not possible to switch the system delivering the incoming call, the number of incoming call air minutes are accumulated by the call timer so that, upon next placing an outgoing call, proper account may be taken of the number of air minutes already used for either incoming or outgoing calls.

Those skilled in the art will appreciate that the methods and apparatus of flowchart illustrations 8–10 may be implemented, for example, using a communications terminal such as the radiotelephone 500 of FIG. 5. For example, the critical values for the first and second communications tariffs may be stored in the smart card 100 that is coupled to the radiotelephone 500 via smart card interface 110. The control processor 10 may perform computations of cumulative communications units usage and projected usage based on information received from the transceiver 20, and may compare these computed values with the critical values stored in the smart card. The comparison may also take place by storing the critical values from the smart card 100 into the memory 40 and using the critical values stored in the memory 40 for comparison. The control processor 10 may also cause the appropriate indications of economic efficiency by way of the display 90 or the speaker 70, for example. The control processor 10 may also initiate austerity measures in response to undesirably high usage, such as disabling portions of the transceiver 20.

Those skilled the art will appreciate, however, that portions of the methods and apparatus of the present invention may be performed in other components than the communications terminal. Should a service provider be inclined to provide a service which offers enhanced user control of usage, the tariff storage, determination of usage and initiation of measures to control usage could be performed by the service provider's system, with or without communication of information to the user terminal. For example, the storage of critical values and determination of cumulative units usage could be performed at a mobile telephone switching office (MTSO) or other node of a cellular network, and relayed to a radiotelephone in a manner similar to the way in which other control information is provided. Austerity measures could also be initiated by the system.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of controlling expense incurred by a communications terminal that communicates with a first mobile radiotelephone communication system and a second mobile radiotelephone communication system, the method comprising the steps of:

storing first and second critical values which characterize a tariff structure of the respective first and second mobile radiotelephone communications systems;

measuring communications units used by the communications terminal;

determining an economic efficiency associated with use of the terminal to communicate with the first and second mobile radiotelephone communication systems from the measured communications units and the first and second stored critical values; and initiating measures to control communications usage with the first and second radiotelephone communications systems by the terminal based on the determined economic efficiency.

2. A method according to claim 1 wherein said step of initiating comprises the step of initiating a communication session with one of the first and second mobile radiotelephone communications systems based on the determined economic efficiency.

3. A method according to claim 2 wherein said step of initiating a communication session comprises the step of automatically initiating a communication session with one of the first and second mobile radiotelephone communications systems based on the determined economic efficiency, in response to user initiation of a radiotelephone communication session.

4. A method according to claim 2 wherein said step of initiating a communication session comprises the step of directing a user to initiate a communication session with one of the first and second mobile radiotelephone communications systems based on the determined economic efficiency, in response to user initiation of a radiotelephone communication session.

5. A method according to claim 4 wherein the directing step comprises the step of providing at least one of a visible indication and an audible indication to the user to initiate a communication session with one of the first and second mobile radiotelephone communications systems based on the determined economic efficiency, in response to user initiation of a radiotelephone communication session.

6. A method according to claim 1, further comprising the step of conducting a communication session between the communications terminal and one of the first and second mobile radiotelephone communications systems; and wherein said step of measuring comprises the step of measuring communication units during the communication session; and wherein said step of initiating comprises the step of initiating measures to control communications unit usage by the communications terminal with the one of the first and second mobile radiotelephone communications systems, based on the determined economic efficiency during the communication session.

7. A method according to claim 6 wherein said step of initiating measures comprises the step of automatically performing handover of the communication session from the one of the first and second mobile radiotelephone communications systems to the other of the first and second mobile radiotelephone communications systems based on the determined economic efficiency during the communications session.

8. A method according to claim 6 wherein said step of initiating measures comprises the step of directing a user to initiate a new communication session with the other of the first and second mobile radiotelephone communications systems based on the determined economic efficiency.

9. A method according to claim 8 wherein the directing step comprises the step of providing at least one of a visible indication and an audible indication to the user to initiate a new communication session with the other of the first and second mobile radiotelephone communications systems based on the determined economic efficiency.

10. A method according to claim 6 wherein said step of initiating measures comprises the step of automatically terminating the communication session from the one of the first and second mobile radiotelephone communications systems based on the determined economic efficiency during the communications session.

11. A method according to claim 6 wherein said step of initiating measures comprises the step of directing a user to terminate the communication session with the one of the first and second mobile radiotelephone communications systems based on the determined economic efficiency.

12. A method according to claim 11 wherein the directing step comprises the step of providing at least one of a visible indication and an audible indication to the user to terminate the communication session with the one of the first and second mobile radiotelephone communications systems based on the determined economic efficiency.

13. A method according to claim 1 wherein the step of storing first and second critical values comprises the step of storing the first and second critical values in a smart card that is coupled to the communications terminal.

14. A method according to claim 13 wherein the step of storing first and second critical values comprises the step of storing first and second critical values and corresponding first and second billing cycle dates in a smart card that is coupled to the multiple-mode communications terminal.

15. A method according to claim 14 wherein the step of storing further comprises the step of storing user identification information and security information in the smart card that is coupled to the communications terminal.

16. A method according to claim 1 wherein the step of storing first and second critical values comprises the step of storing first and second values of monthly communications units that are allowed for a fixed fee by the respective first and second mobile radiotelephone communications systems.

17. A method according to claim 1 wherein the step of storing first and second critical values comprises the step of storing first and second amounts of monthly communications units that are allowed for a fixed fee by the respective first and second mobile radiotelephone communications systems, and respective incremental fees for monthly communications units that exceed the respective first and second amounts for the respective first and second mobile radiotelephone communications systems.

18. A method according to claim 1 wherein the step of storing first and second critical values comprises the step of storing first and second values of incoming and outgoing monthly communications units that are allowed for a fixed fee by the respective first and second mobile radiotelephone communications systems.

19. An apparatus for controlling expense incurred by a communications terminal that communicates with a first mobile radiotelephone communication system and a second mobile radiotelephone communication system, the apparatus comprising:

means for storing first and second critical values which characterize a tariff structure of the respective first and second mobile radiotelephone communications systems;

means for measuring communications units used by the communications terminal;

means for determining an economic efficiency associated with use of the terminal to communicate with the first and second mobile radiotelephone communication systems from the measured communications units and the first and second stored critical values; and means for initiating measures to control communications usage with the first and second radiotelephone communications systems by the terminal based on the determined economic efficiency.

20. An apparatus according to claim 19 wherein said means for initiating comprises means for initiating a communication session with one of the first and second mobile radiotelephone communications systems based on the determined economic efficiency.

21. An apparatus according to claim 20 wherein said means for initiating a communication session comprises means for automatically initiating a communication session with one of the first and second mobile radiotelephone communications systems based on the determined economic efficiency, in response to user initiation of a radiotelephone communication session.

22. An apparatus according to claim 20 wherein said means for initiating a communication session comprises means for directing a user to initiate a communication session with one of the first and second mobile radiotelephone communications systems based on the determined economic efficiency, in response to user initiation of a radiotelephone communication session.

23. An apparatus according to claim 22 wherein said means for directing comprises means for providing at least one of a visible indication and an audible indication to the user to initiate a communication session with one of the first and second mobile radiotelephone communications systems based on the determined economic efficiency, in response to user initiation of a radiotelephone communication session.

24. An apparatus according to claim 19, further comprising means for conducting a communication session between the communications terminal and one of the first and second mobile radiotelephone communications systems; and wherein said means for measuring comprises means for measuring communication units during the communication session; and wherein said means for initiating comprises means for initiating measures to control communications unit usage by the communications terminal with the one of the first and second mobile radiotelephone communications systems, based on the determined economic efficiency during the communication session.

25. An apparatus according to claim 24 wherein said means for initiating measures comprises means for automatically performing handover of the communication session from the one of the first and second mobile radiotelephone communications systems to the other of the first and second mobile radiotelephone communications systems based on the determined economic efficiency during the communications session.

26. An apparatus according to claim 24 wherein said means for initiating measures comprises means for directing a user to initiate a new communication session with the other of the first and second mobile radiotelephone communications systems based on the determined economic efficiency.

27. An apparatus according to claim 26 wherein said means for directing comprises means for providing at least one of a visible indication and an audible indication to the user to initiate a new communication session with the other of the first and second mobile radiotelephone communications systems based on the determined economic efficiency.

28. An apparatus according to claim 24 wherein said means for initiating measures comprises means for automatically terminating the communication session from the one of the first and second mobile radiotelephone communications systems based on the determined economic efficiency during the communications session.

29. An apparatus according to claim 24 wherein said means for initiating measures comprises means for directing a user to terminate the communication session with the one of the first and second mobile radiotelephone communications systems based on the determined economic efficiency.

30. An apparatus according to claim 29 wherein said means for directing comprises means for providing at least one of a visible indication and an audible indication to the user to terminate the communication session with the one of the first and second mobile radiotelephone communications systems based on the determined economic efficiency.

31. An apparatus according to claim 19 wherein said means for storing first and second critical values comprises means for storing the first and second critical values in a smart card that is coupled to the communications terminal.

32. An apparatus according to claim 31 wherein said means for storing first and second critical values comprises means for storing first and second critical values and corresponding first and second billing cycle dates in a smart card that is coupled to a multiple-mode communications terminal.

33. An apparatus according to claim 32 wherein said means for storing further comprises means for storing user identification information and security information in the smart card that is coupled to the communications terminal.

34. An apparatus according to claim 19 wherein said means for storing first and second critical values comprises means for storing first and second values of monthly communications units that are allowed for a fixed fee by the respective first and second mobile radiotelephone communications systems.

35. An apparatus according to claim 19 wherein said means for storing first and second critical values comprises means for storing first and second amounts of monthly communications units that are allowed for a fixed fee by the respective first and second mobile radiotelephone communications systems, and respective incremental fees for monthly communications units that exceed the respective first and second amounts for the respective first and second mobile radiotelephone communications systems.

36. An apparatus according to claim 19 wherein said means for storing first and second critical values comprises means for storing first and second values of incoming and outgoing monthly communications units that are allowed for a fixed fee by the respective first and second mobile radiotelephone communications systems.

37. A multiple-mode mobile radiotelephone communications terminal, comprising:
   means for communicating with a first mobile radiotelephone communication system and a second mobile radiotelephone communication system;
   means for storing first and second critical values which characterize a tariff structure of the respective first and second mobile radiotelephone communications systems;
   means for measuring communications units used by the communications terminal;
   means for determining an economic efficiency associated with use of the terminal to communicate with the first and second mobile radiotelephone communication systems from the measured communications units and the first and second stored critical values; and
   means for initiating measures to control communications usage with the first and second radiotelephone communications systems by the terminal based on the determined economic efficiency.

38. A terminal according to claim 37 wherein said means for initiating comprises means for initiating a communication session with one of the first and second mobile radiotelephone communications systems based on the determined economic efficiency.

39. A terminal according to claim 38 wherein said means for initiating a communication session comprises means for automatically initiating a communication session with one of the first and second mobile radiotelephone communications systems based on the determined economic efficiency, in response to user initiation of a radiotelephone communication session.

40. A terminal according to claim 38 wherein said means for initiating a communication session comprises means for directing a user to initiate a communication session with one of the first and second mobile radiotelephone communications systems based on the determined economic efficiency, in response to user initiation of a radiotelephone communication session.

41. A terminal according to claim 40 wherein said means for directing comprises means for providing at least one of a visible indication and an audible indication to the user to initiate a communication session with one of the first and second mobile radiotelephone communications systems based on the determined economic efficiency, in response to user initiation of a radiotelephone communication session.

42. A terminal according to claim 37, further comprising means for conducting a communication session between the communications terminal and one of the first and second mobile radiotelephone communications systems; and
   wherein said means for measuring comprises means for measuring communication units during the communication session; and
   wherein said means for initiating comprises means for initiating measures to control communications unit usage by the communications terminal with the one of the first and second mobile radiotelephone communications systems, based on the determined economic efficiency during the communication session.

43. A terminal according to claim 42 wherein said means for initiating measures comprises means for automatically performing handover of the communication session from the one of the first and second mobile radiotelephone communications systems to the other of the first and second mobile radiotelephone communications systems based on the determined economic efficiency during the communications session.

44. A terminal according to claim 42 wherein said means for initiating measures comprises means for directing a user to initiate a new communication session with the other of the first and second mobile radiotelephone communications systems based on the determined economic efficiency.

45. A terminal according to claim 44 wherein said means for directing comprises means for providing at least one of a visible indication and an audible indication to the user to initiate a new communication session with the other of the first and second mobile radiotelephone communications systems based on the determined economic efficiency.

46. A terminal according to claim 42 wherein said means for initiating measures comprises means for automatically terminating the communication session from the one of the first and second mobile radiotelephone communications systems based on the determined economic efficiency during the communications session.

47. A terminal according to claim 42 wherein said means for initiating measures comprises means for directing a user to terminate the communication session with the one of the first and second mobile radiotelephone communications systems based on the determined economic efficiency.

48. A terminal according to claim 47 wherein said means for directing comprises means for providing at least one of a visible indication and an audible indication to the user to terminate the communication session with the one of the first and second mobile radiotelephone communications systems based on the determined economic efficiency.

49. A terminal according to claim 37 wherein said means for storing first and second critical values comprises means for storing the first and second critical values in a smart card that is coupled to the communications terminal.

50. A terminal according to claim 49 wherein said means for storing first and second critical values comprises means for storing first and second critical values and corresponding first and second billing cycle dates in a smart card that is coupled to the multiple-mode communications terminal.

51. A terminal according to claim 50 wherein means for storing further comprises means for storing user identification information and security information in the smart card that is coupled to the communications terminal.

52. A terminal according to claim 37 wherein said means for storing first and second critical values comprises means for storing first and second values of monthly communications units that are allowed for a fixed fee by the respective first and second mobile radiotelephone communications systems.

53. A terminal according to claim 37 wherein said means for storing first and second critical values comprises means for storing first and second amounts of monthly communications units that are allowed for a fixed fee by the respective first and second mobile radiotelephone communications systems, and respective incremental fees for monthly communications units that exceed the respective first and second amounts for the respective first and second mobile radiotelephone communications systems.

54. A terminal according to claim 37 wherein said means for storing first and second critical values comprises the step of storing first and second values of incoming and outgoing monthly communications units that are allowed for a fixed fee by the respective first and second mobile radiotelephone communications systems.

* * * * *